United States Patent
Tokudome

(10) Patent No.: US 7,218,224 B2
(45) Date of Patent: May 15, 2007

(54) HUMAN BODY DETECTION SENSOR

(75) Inventor: Tetsuo Tokudome, Akigun (JP)

(73) Assignee: U-Shin Ltd., Tokyo (JP)

( * ) Notice: Subject to any disclaimer, the term of this patent is extended or adjusted under 35 U.S.C. 154(b) by 185 days.

(21) Appl. No.: 11/047,770

(22) Filed: Feb. 2, 2005

(65) Prior Publication Data

US 2005/0184876 A1 Aug. 25, 2005

(30) Foreign Application Priority Data

Feb. 20, 2004 (JP) ............... 2004-044777

(51) Int. Cl.
*G08B 13/26* (2006.01)
(52) U.S. Cl. ............ 340/561; 340/501; 340/506; 340/567; 340/551
(58) Field of Classification Search .......... None
See application file for complete search history.

(56) References Cited

U.S. PATENT DOCUMENTS

| | | | | |
|---|---|---|---|---|
| 3,327,307 A | * | 6/1967 | Miles | 342/112 |
| 3,683,351 A | * | 8/1972 | Merton et al. | 340/561 |
| 3,706,982 A | * | 12/1972 | Gehman | 340/539.1 |
| 3,896,425 A | * | 7/1975 | Erichsen | 340/563 |
| 4,155,078 A | * | 5/1979 | Bowling et al. | 340/561 |
| 4,169,260 A | * | 9/1979 | Bayer | 340/562 |
| 4,197,530 A | * | 4/1980 | Fletcher et al. | 340/602 |
| 4,208,695 A | * | 6/1980 | Noda et al. | 361/181 |
| 4,212,002 A | * | 7/1980 | Williamson | 340/572.4 |
| 4,222,045 A | * | 9/1980 | Cholin | 340/628 |
| 4,364,046 A | * | 12/1982 | Ogasawara et al. | 340/870.37 |
| 4,484,183 A | * | 11/1984 | Morey | 340/568.1 |
| 4,818,999 A | * | 4/1989 | Kobayashi et al. | 342/59 |
| 5,130,672 A | * | 7/1992 | Watkiss et al. | 331/65 |
| 7,109,862 B2 | * | 9/2006 | Braeuchle et al. | 340/562 |

FOREIGN PATENT DOCUMENTS

| | | |
|---|---|---|
| JP | 7-189538 | 7/1995 |
| JP | 2002-295094 | 10/2002 |

* cited by examiner

*Primary Examiner*—Daniel Wu
*Assistant Examiner*—Son Tang
(74) *Attorney, Agent, or Firm*—Wenderoth, Lind & Ponack, L.L.P.

(57) ABSTRACT

A human body detection sensor includes two oscillation circuits, a tuning circuit which connects equivalent points of the two oscillation circuits to each other, an antenna electrode which is connected to any one of the oscillation circuits so that a change in circuit state occurs upon approach of a human body, and a wave detector circuit for detecting a shift of oscillation between the two oscillation circuits.

5 Claims, 8 Drawing Sheets

HUMAN BODY DETECTION SENSOR

BACKGROUND OF THE INVENTION

The present invention relates to a sensor for detecting any approach or contact of a human body.

In a conventional human body detection sensor, an electric signal generated by an oscillation circuit is inputted to a detection circuit including a detection capacitor, which is provided so as to change its capacitance due to the approach of a human body, as well as to a reference circuit equivalent to the detection circuit conditioned by no approach of any human body to the detection capacitor, and through a comparison between an output of the detection circuit and an output of the reference circuit, any change in waveform or phase of the output of the detection circuit is detected, by which approach of a human body to the detection capacitor is detected. However, with such a human body detection sensor, in particular, the more the capacitances of the detection capacitor and the connecting line for connecting the detection capacitor are large, the more the capacitances of the detection capacitor and the connecting line change due to temperature. As a result of this, there has been an issue that constant detection results could not be obtained because of changes in the output of the detection circuit due to temperature.

Japanese Patent Laid-Open Publication No. H07-189538 discloses a human body detection sensor provided with a temperature compensation circuit that, through a comparison between outputs of a detection circuit and a reference circuit, changes the threshold value, which serves as a reference for decision as to approach of a human body to the detection capacitor, depending on temperature detected by a thermistor. In this case, however, there is an issue that providing a multiplicity of detection capacitors would make it necessary to provide the same number of reference circuits and temperature compensation circuits as well. Further, Japanese Patent Laid-Open Publication No. 2002-295094 discloses a sensor which has two detection capacitors and, through a comparison outputs of their respective antenna circuits, decides as to whether or not any human body is approaching. However, there is a problem that this sensor is applicable only to cases where any human body approaches only one of the two detection capacitors.

SUMMARY OF THE INVENTION

Accordingly, an object of the present invention is to provide a human body detection sensor capable of detecting an approach of any human body stably without being affected by temperature or the like.

According to the present invention, there is provided a human body detection sensor including:

two oscillation circuits;

a tuning circuit which connects equivalent points of the two oscillation circuits to each other;

an antenna electrode which is connected to any one of the oscillation circuits so that a change in circuit state occurs upon approach of a human body; and a wave detector circuit for detecting a shift of oscillation between the two oscillation circuits.

In this human body detection sensor, when no human body is approaching, the antenna electrode is not grounded, giving no influence on the impedance of the oscillation circuit to which the antenna electrode is connected, so that the two oscillation circuits are of equal circuit characteristics. When the two oscillation circuits are shifted in phase from each other, part of the current is diverted from one oscillation circuit to the other oscillation circuit through the tuning circuit, acting to slightly increase or decrease the oscillating frequency so that the oscillation circuits are made closer in phase to each other and tuned with each other. When a human body approaches the antenna electrode, there occurs a capacitance, resistance and/or inductance between the antenna electrode and the ground, where the oscillating frequency of the oscillation circuit is changed because part of the current is diverted also to the antenna electrode from the oscillation circuit to which the antenna electrode is connected. When this change in oscillating frequency due to the antenna electrode has gone beyond the power of the tuning action by the tuning circuit, there arises a difference in oscillating frequency between the two oscillation circuits. The wave detector circuit is capable of detecting any approach of a human body to the antenna electrode by detecting the shift between outputs of the two oscillation circuits.

When no human body is approaching the antenna electrode, the antenna electrode is substantially absent as viewed from the oscillation circuit, where since the two oscillation circuits change in circuit state in a manner equal to each other, outputs of the two oscillation circuits are kept tuned with each other even with the temperature changed. Therefore, since the detection precision is little affected by temperature, there is no need for compensation by temperature. Also, even if outputs of the two oscillation circuits are unequal to each other due to temperature changes, circuit variations, circuit construction differences or the like, the outputs of the two oscillation circuits can be tuned with each other by the tuning circuit even with differences, so that any difference between the outputs of the oscillation circuits can be absorbed.

Further, since adding up the two outputs causes occurrence of a beat because of a shift in frequency between the two oscillation circuits, the wave detector circuit can detect any approach of a human body to the antenna electrode by detecting the beat whose period is shorter than the oscillating frequency of the oscillation circuit. Thus, since the approach of a human body can be detected from a period shift between the two oscillation circuits, the detection sensor never changes in sensitivity due to any changes in the output of the oscillation circuit caused by temperature changes or circuit variations, so that the human body detection sensor can be enhanced in sensitivity.

In the human body detection sensor of the invention, the tuning circuit may be a circuit which connects the two oscillation circuits to each other via at least one element.

In this case, the power of the tuning circuit for tuning the two oscillation circuits by the element can be set to any arbitrary one. With a high tuning power of the tuning circuit, a slight state change of the antenna electrode does not appear as a period shift between outputs of the two oscillation circuits, so that the human body detection sensor can be made low in sensitivity. On the other hand, with a low tuning power of the tuning circuit, the human body detection sensor can be made high in sensitivity.

In the human body detection sensor of the invention, a plurality of the antenna electrodes may be provided.

In this case, approach of a human body to any one of the plurality of antenna electrodes can be detected. Also, even with a plurality of antenna electrodes connected, there is no need for reference circuits corresponding to the antenna electrodes, and therefore the oscillation circuits and the wave detector circuit do not need to be changed in structure.

In the human body detection sensor of the invention, a sensitivity control circuit may be provided between the or each antenna electrode and the oscillation circuits.

In this case, it is easily achievable to set sensitivity for each one of the antenna electrodes.

In the human body detection sensor of the invention, a protection circuit for blocking or reducing inflow of static electricity from the antenna electrode to the oscillation circuits may be provided between the or each antenna electrode and the oscillation circuits.

In this case, the possibility that static electricity stored on the human body may flow from the antenna electrode into the oscillation circuits to damage the circuit can be prevented.

As described above, according to the present invention, there can be provided a human body detection sensor which is capable of detecting approach of any human body stably without being affected by temperature.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
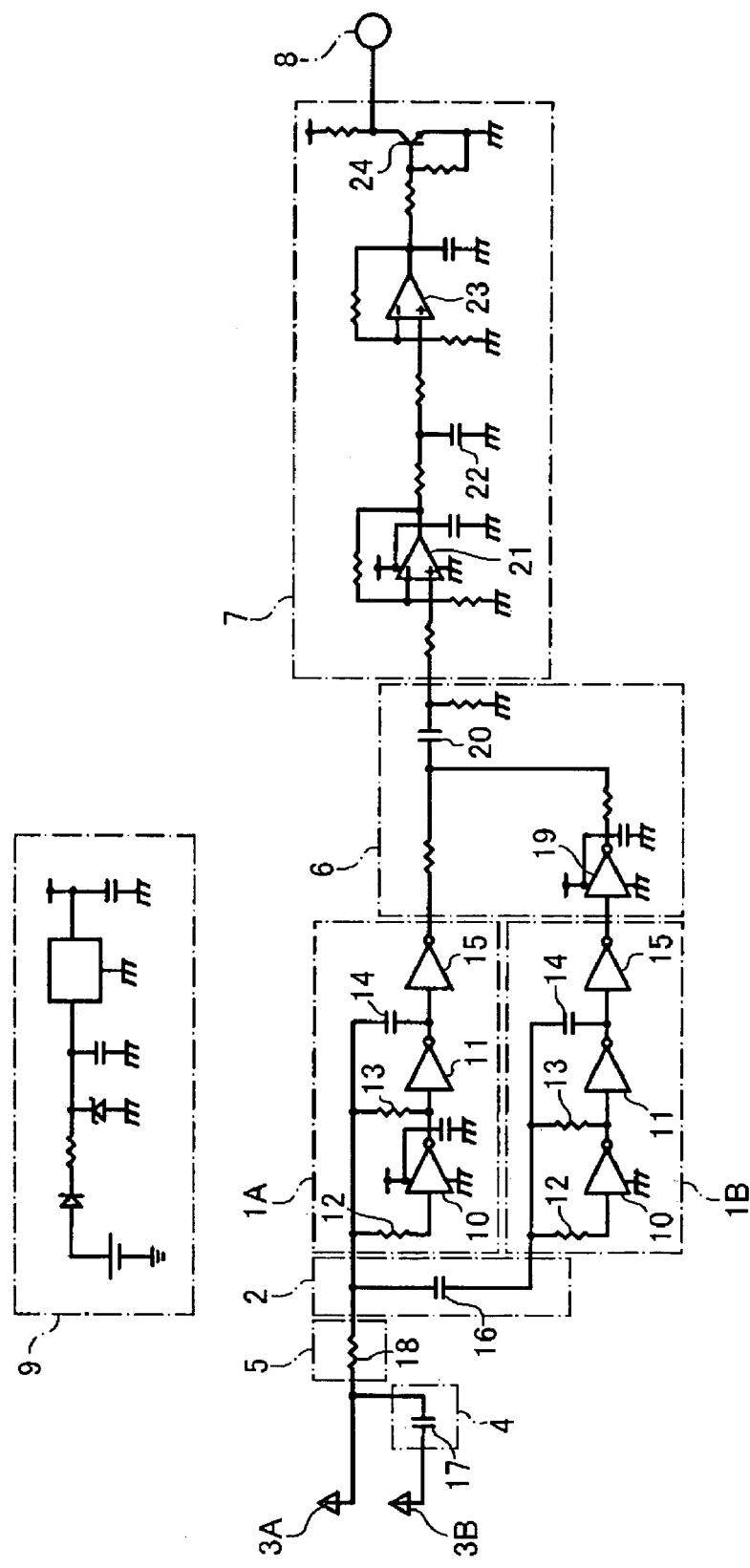
FIG. 1 is a circuit diagram of a human body detection sensor according to a first embodiment of the present invention.

FIG. 1 shows a circuit diagram of a human body detection sensor according to a first embodiment of the present invention. The human body detection sensor of this embodiment has two oscillation circuits 1A and 1B, where an input side of each of the oscillation circuits 1A and 1B is connected to a tuning circuit 2 while antenna electrodes 3A and 3B are connected to the input side of the oscillation circuit 1A. A sensitivity control circuit 4 is provided between the antenna electrode 3B and the oscillation circuit 1A, and the antenna electrodes 3A and 3B are connected to the oscillation circuit 1A via a protection circuit 5. Output sides of the oscillation circuits 1A and 1B are connected to a wave detector circuit 6, an output side of the wave detector circuit 6 is connected to an output circuit 7, and the output circuit 7 has an output terminal 8. This human body detection sensor further has a power circuit for supplying electric power to the oscillation circuits 1A and 1B, the wave detector circuit 6 and the output circuit 7.

In each of the oscillation circuits 1A and 1B, with CMOS inverters 10 and 11 connected in series, outputs are fed back and oscillated via resistors 12, 13 and a capacitor 14, and then inverted and amplified by a CMOS inverter 15, thus being outputted. By a tuning circuit 2, the input side of the oscillation circuit 1A and the input side of the oscillation circuit 1B are connected to each other via a tuning capacitor 16. A sensitivity control circuit 4 is a sensitivity control capacitor 17 which is connected in series to the antenna electrode 3B, and the protection circuit 5 is a static shield resistor 18. In the wave detector circuit 6, the output side of the oscillation circuit 1B is connected to the output side of the oscillation circuit 1A via a CMOS inverter 19 and outputted through a capacitor 20. In the output circuit 7, an output of the wave detector circuit 6 is inputted to an operational amplifier 21 and, after grounding by a smoothing capacitor 22, connected to a transistor 24 via an operational amplifier 23, where a collector of the transistor 24 leads to the output terminal 8.

Figure 2:
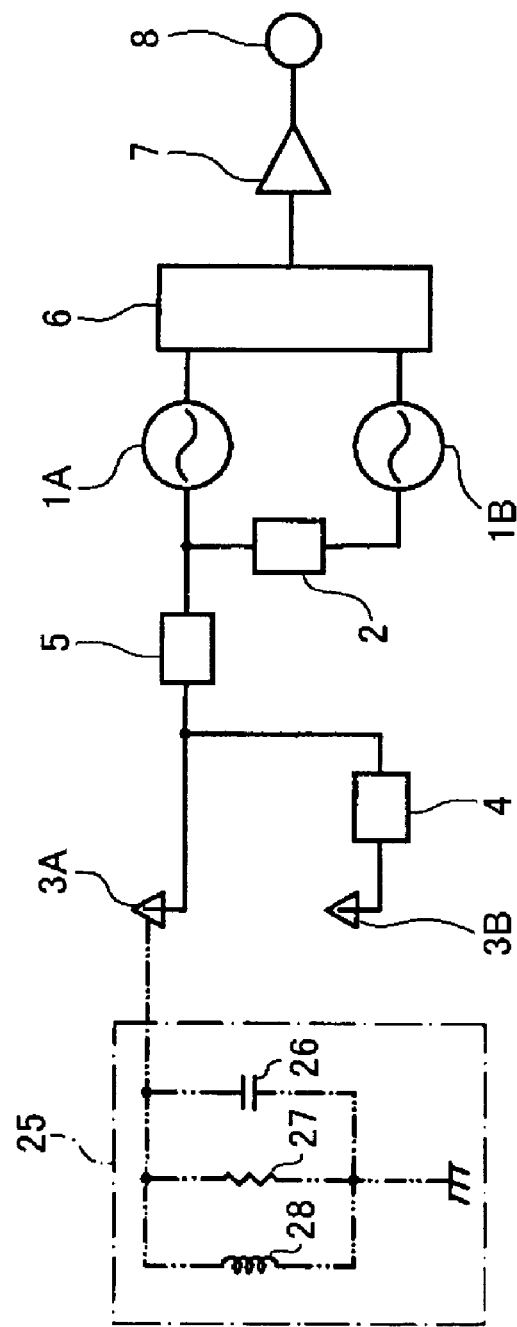
FIG. 2 is a circuit diagram of the human body detection sensor of FIG. 1 as it is simplified.

FIG. 2 is a circuit diagram of the human body detection sensor of FIG. 1 as it is simplified, where an equivalent circuit with a human body 25 approaching to the antenna electrode 3A is further shown by two-dot chain line. The human body 25 can be regarded as a circuit in which the antenna electrode 3A is grounded by a capacitance 26, a resistor 27 and an inductance 28.

Next, operation of the human body detection sensor having the above-described circuit construction is explained. The oscillation circuits 1A and 1B, which are known rectangular-wave oscillation circuits, have their oscillating frequencies determined depending on the values of the resistors 12, 13 and the capacitor 14. If oscillation periods of the oscillation circuits 1A and 1B are coincident with each other, then equivalent points of the oscillation circuits 1A and 1B are equal in voltage to each other, so that voltages at both ends of the tuning circuit 2 are the same. However, if oscillation periods of the oscillation circuits 1A and 1B are shifted from each other, then voltages at both ends of the tuning circuit 2 are different from each other, so that part of a feedback current of either one of the oscillation circuits 1A and 1B flows to the other oscillation circuit 1A or 1B via the tuning capacitor 16. Thus, the oscillation circuit 1A or 1B, whichever it is advanced in phase, becomes longer in period while the oscillation circuit 1B or 1A, whichever it is lagged in phase, becomes shorter in period, by which the oscillation circuits 1A and 1B are tuned with each other so that the voltages at both ends of the tuning circuit 2 become equal to each other.

Figure 3:
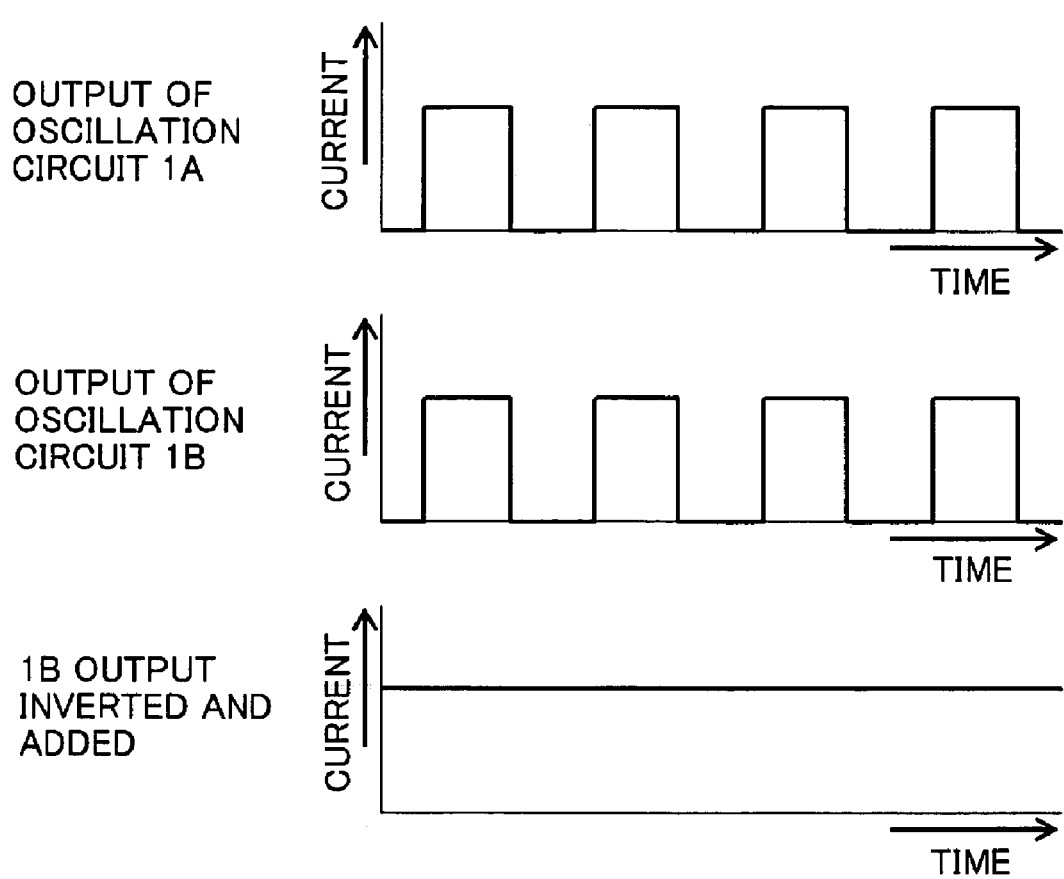
FIG. 3 includes graphs showing output waveforms of two oscillation circuits and a wave detector circuit under the condition that no human body is approaching to the antenna electrode of the human body detection sensor of FIG. 1.

When this occurs, outputs of the oscillation circuits 1A and 1B are as shown by the waveforms of FIG. 3. As output waveforms of the oscillation circuits 1A and 1B are identical rectangular waves, inverting an output of the oscillation circuit 1B by the inverter 19 of FIG. 1 and adding the result to an output of the oscillation circuit 1A results in a direct current as shown in FIG. 3. The direct current, which cannot pass through the capacitor 20 of FIG. 1, will not be outputted from the wave detector circuit 6. Since the output circuit 7 has no input, the output terminal 8 maintains the power supply voltage.

Figure 4:
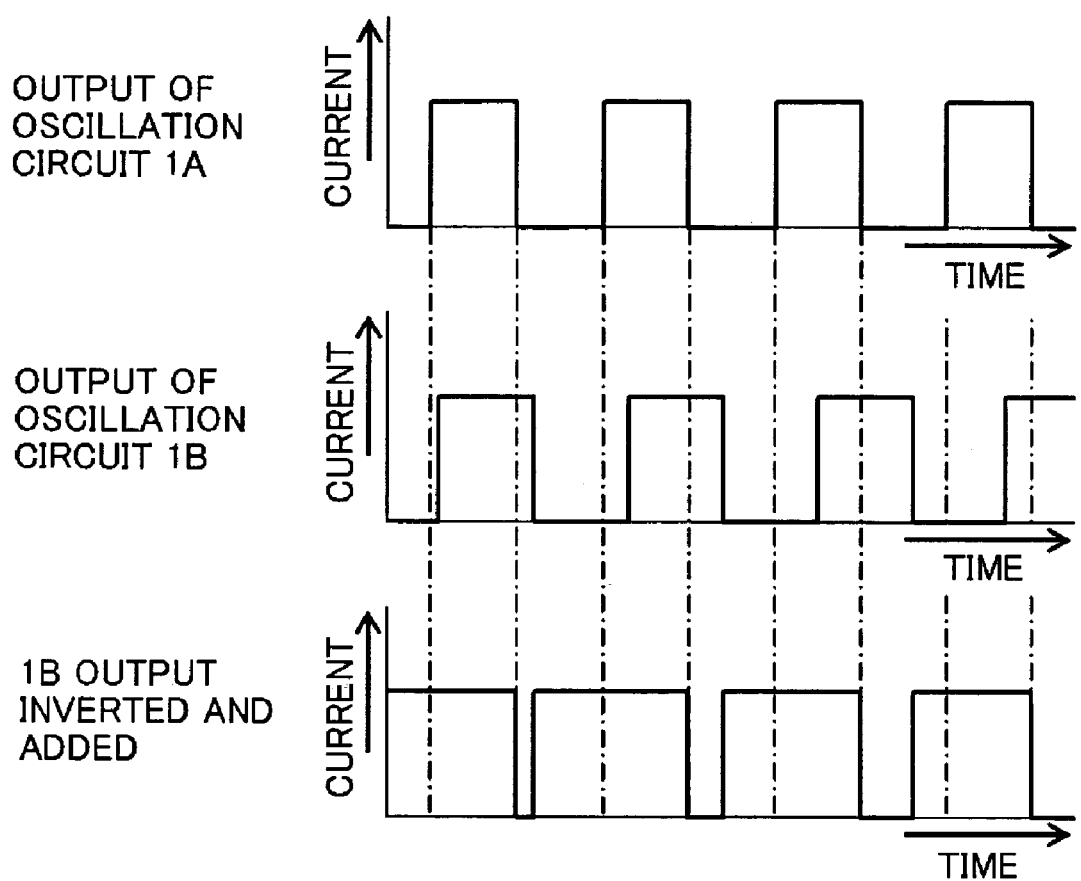
FIG. 4 includes graphs showing output waveforms of two oscillation circuits and a wave detector circuit under the condition that a human body is approaching to the antenna electrode of the human body detection sensor of FIG. 1.

However, when the human body 25 is approaching the antenna 3A to make up a grounding circuit as shown in FIG. 2, part of the feedback current of the oscillation circuit 1A flows from the human body 25 to the ground via the antenna electrode 3A, causing the oscillating frequency of the oscillation circuit 1A to change. If the change in oscillating frequency is a slight one, the oscillation circuit 1A and the oscillation circuit 1B are tuned so as to be coincident in period with each other by the action of the tuning circuit 2. With larger changes in oscillating frequency, however, it becomes impossible even for the tuning circuit 2 to achieve the tuning of periods. Then, the waveform derived from inverting and adding the output of the oscillation circuit 1B to the output of the oscillation circuit 1A results in an discontinuous rectangular wave as shown in FIG. 4. An a.c. component contained in this waveform passes through the capacitor 20, being outputted from the wave detector circuit 6 to the output circuit 7. This a.c. output is amplified by the operational amplifier 21 of the output circuit 7, smoothed into a direct current by the smoothing capacitor 22, and amplified again by the operational amplifier 23, thus causing the transistor 24 to switch. In this way, the output terminal 8 is grounded, by which the voltage is changed to the ground level.

In the human body detection sensor of this embodiment, since the oscillation circuits 1A and 1B are of the same structure, and oscillating frequencies of the oscillation circuits 1A and 1B vary nearly equally even with the temperature being varied, the oscillation circuits 1A and 1B are keep tuned in oscillation period with each other by the tuning circuit 2 unless the human body 25 is approaching the antenna electrodes 3A and 3B. Therefore, the human body detection sensor of this embodiment is enabled to detect the approach of a human body stably without mis-detection due to temperature changes.

Whereas two antenna electrodes 3A and 3B are connected to the oscillation circuit 1A in this embodiment, the antenna electrodes 3A and 3B do not contribute at all to the oscillation of the oscillation circuits 1A and 1B under the condition that no human body is approaching. Therefore, even if any additional antenna electrode is connected in parallel, there occurs no influence on the tuning of the oscillation circuits 1A and 1B, so that approach of the human body 25 to the additional antenna electrode can be detected as a shift of oscillation period of the oscillation circuits 1A and 1B. That is, the human body detection sensor of the present invention allows the antenna electrodes to be increased or decreased without changing the oscillation circuits 1A and 1B, the wave detector circuit 6, the output circuit 7 or the like.

Also in this embodiment, the antenna electrode 3B is provided with the sensitivity control circuit 4 comprising the sensitivity control capacitor 17. Because of the presence of this capacitor 17, when the human body 25 approaches the antenna 3B, ground impedance via the human body 25 as viewed from the oscillation circuit 1A becomes higher. Therefore, the current diverted from the feedback circuit of the oscillation circuit 1A becomes smaller, so that fluctuations of the oscillating frequency become smaller as compared with the antenna electrode 3A. That is, unless the human body 25 approaches closer to the antenna electrode 3B, outputs of the oscillation circuits 1A and 1B are tuned with each other by the tuning circuit 2, with the voltage of the output terminal 8 unchanged. Consequently, when the sensitivity to the human body varies among antenna electrodes, it is implementable to provide sensitivity control circuits for the antenna electrodes, respectively, so that a plurality of antenna electrodes are made coincident in sensitivity thereamong, or to arbitrarily change the distance between the human body and an antenna electrode, from which human body detection is outputted, from antenna electrode to antenna electrode by the sensitivity control circuit.

Further, CMOS or other elements to be used in the oscillation circuits 1A and 1B or the like are subject to a risk of damage due to electrostatic or other instantaneous large currents. However, in this embodiment, since the antenna electrodes 3A and 3B are connected to the oscillation circuit 1A via the protection circuit 5 comprising the static shield resistor 18, static electricity stored on the human body, even if discharged to the antenna electrodes 3A and 3B, is consumed by the static shield resistor 18, so that no large energy is inputted to the oscillation circuit 1A. Thus, the human body detection sensor of this embodiment is prevented from faults due to static electricity by the protection circuit 5.

Figure 5:
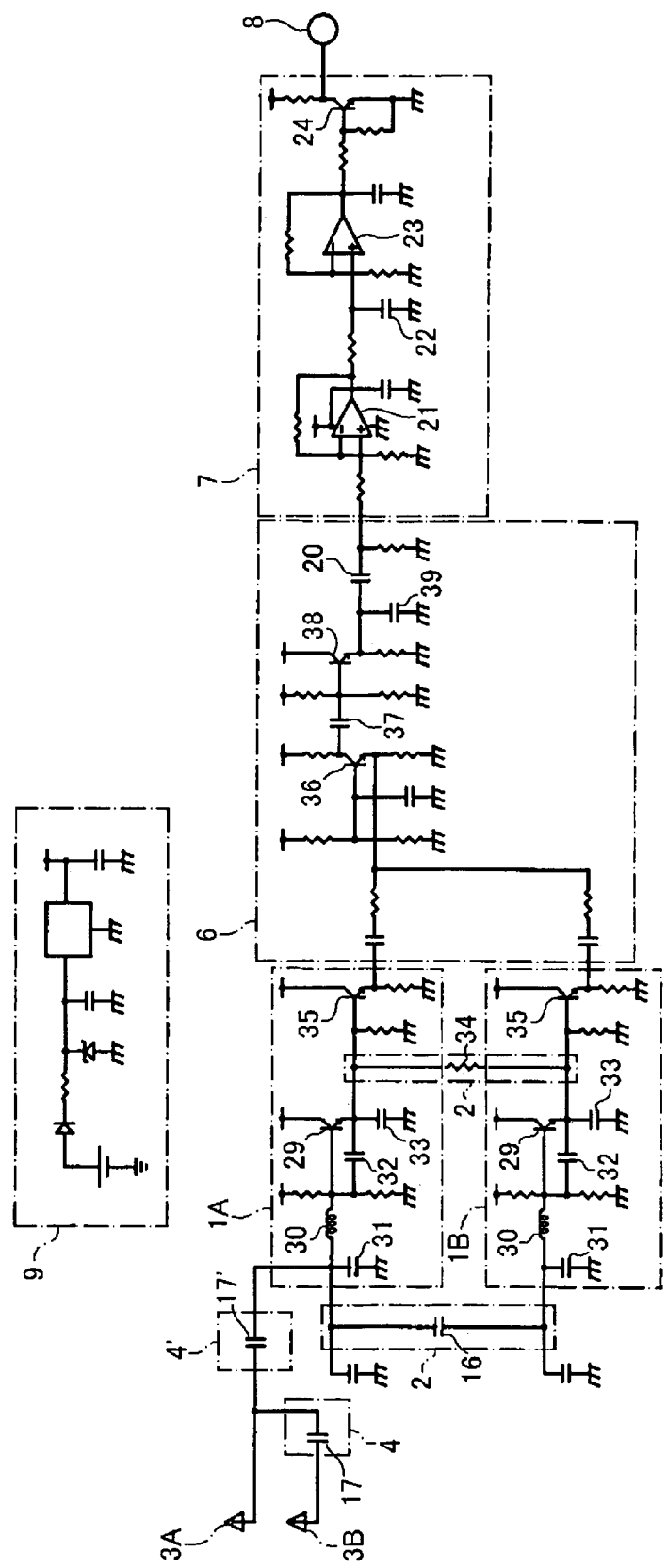
FIG. 5 is a circuit diagram of a human body detection sensor according to a second embodiment of the invention.

FIG. 5 shows a human body detection sensor according to a second embodiment of the invention. In this embodiment, in addition to the input-side tuning circuit 2, a tuning circuit 2' is provided on the output side in the two oscillation circuits 1A and 1B, and further a sensitivity control circuit 4' comprising a sensitivity control capacitor 17' is provided between the oscillation circuit 1A and a connecting point between the two antenna electrodes 3A and 3B. The oscillation circuits 1A and 1B of this embodiment are known sine-wave oscillation circuits in which a coil 30 and capacitors 31, 32, 33 are connected to a bipolar transistor 29. The tuning circuit 2' serves for connection of outputs of the transistors 29 of the oscillation circuits 1A and 1B via a tuning resistor 34. An output of the transistor 29 is outputted to the wave detector circuit 6 via a transistor 35. In the wave detector circuit 6, outputs of the oscillation circuits 1A and 1B are added, connecting to an emitter of a transistor 36, and a collector output of the transistor 36 is inputted to a transistor 38 via a capacitor 37, and further outputted to an output circuit 7 via capacitors 39 and 20. The output circuit 7 is similar in structure to that of the first embodiment, having an output terminal 8. A power circuit 9 is further provided, similar to the first embodiment.

Characteristics of the operation of the human body detection sensor of this embodiment are explained. Oscillating frequencies of the oscillation circuits 1A and 1B are determined by the coil 30 and the capacitors 31, 32, 33. The tuning circuit 2' connects to the output side of the transistor 29 by the tuning resistor 34 and, according to a phase difference between the oscillation circuits 1A and 1B, makes part of an output inputted to their feedback circuits, thus fulfilling the function of tuning the oscillating frequencies like the tuning circuit 2. Also, though the sensitivity control capacitor 17' of the sensitivity control circuit 4' acts to lower the sensitivity of both antenna electrode 3A and antenna electrode 3B, it is also possible to provide sensitivity control circuits for the antenna electrode 3A and the antenna electrode 3B, respectively, where a similar function is fulfilled.

In the wave detector circuit 6, outputs of the oscillation circuit 1A and the oscillation circuit 1B are added and the transistor 36 is switched, by which a rectangular wave is generated and, with d.c. components removed by the capacitor 37, amplified by the transistor 38. In this case, if the periods of the oscillation circuits 1A and 1B are coincident with each other, then the waveform to be inputted to the transistor 36 is a sine wave and therefore the output of the transistor 38 results in a regular rectangular wave having a period equal to the oscillating frequency of the oscillation circuits 1A and 1B. If the periods of the oscillation circuits 1A and 1B are not coincident with each other or if the amplitude of one-side oscillation circuit 1A has changed to such an extent that the tuning by the tuning circuit 2 can no longer be achieved, the output of the transistor 38 results in an irregular rectangular wave. A regular rectangular wave composed of only frequency components higher than the oscillating frequencies of the oscillation circuits 1A and 1B is grounded through the capacitor 39, thus not being outputted from the wave detector circuit 6 to the output circuit 7. On the other hand, only periodical changes of a irregular rectangular wave is outputted from the wave detector circuit 6 to the output circuit 7 without being grounded by the capacitor 39 because the periodical changes of the irregular rectangular wave are low in frequency. That is, only a beat component of low frequency due to a frequency difference between the oscillation circuit 1A and the oscillation circuit 1B or changes in the amplitude of the one-side oscillation circuit 1A is outputted from the wave detector circuit 6 to the output circuit 7. The output circuit 7 amplifies and smoothes the beat component inputted from the wave detector circuit 6, and switches the transistor 24, thus changing the voltage of the output terminal 8.

Since the wave detector circuit 6 of this embodiment extracts only the beat component of low frequency due to the frequency difference between the oscillation circuit 1A and the oscillation circuit 1B or changes in the amplitude of the one-side oscillation circuit 1A, even with differences in periodical output waveform or amplitude between the oscillation circuit 1A and the oscillation circuit 1B, the voltage of the output terminal 8 can be changed only when the human body 25 approaches the antenna electrodes 3A and 3B without being affected by such differences, thus making it possible to achieve high detection precision as well as enhanced detection sensitivity.

Figure 6:
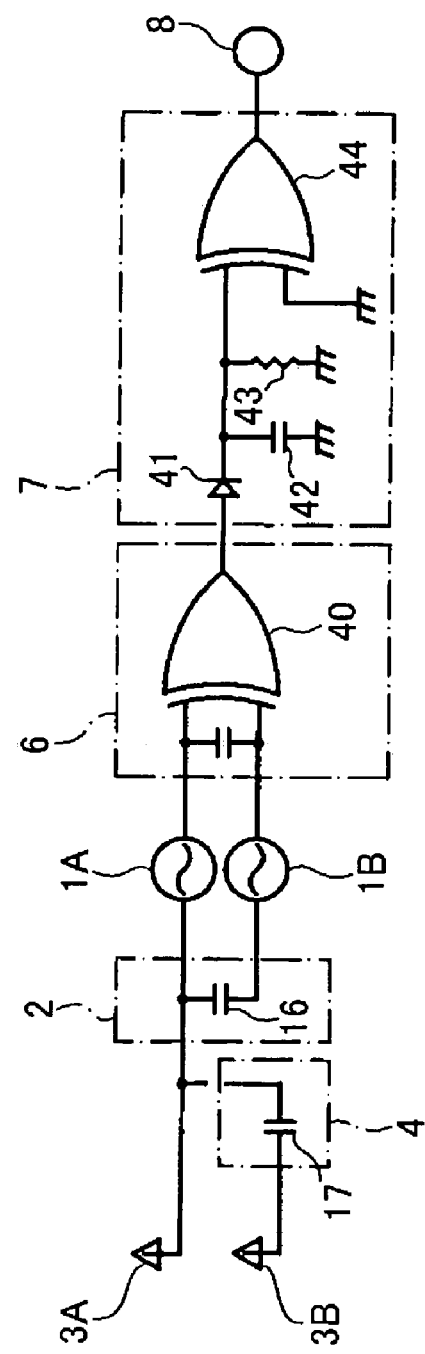
FIG. 6 is a circuit diagram of a human body detection sensor according to a third embodiment of the invention.

FIG. 6 shows a circuit diagram of a human body detection sensor according to a third embodiment of the invention. This embodiment has oscillation circuits 1A and 1B for generating rectangular waves similar to those of the first embodiment, but differs in the structure of the wave detector circuit 6 and the output circuit 7. The wave detector circuit 6 of this embodiment is implemented by an EXCLUSIVE-OR element 40 which is a logic-arithmetic element that recognizes a HI level when the input voltage is higher than a threshold value and a LO level when lower than the threshold value and that outputs a specified voltage depending on the value of an input, where the EXCLUSIVE-OR element 40 outputs a voltage when different values (HI and LO) are given to its two inputs, and does not output the voltage when equal values are given to its two inputs. An output of the EXCLUSIVE-OR element 40 is inputted to a diode 41 of the output circuit 7, grounded by a capacitor 42 and a resistor 43, and connected to one of inputs of an EXCLUSIVE-OR element 44, while the other input of the EXCLUSIVE-OR element 44 is grounded. Then, an output of the EXCLUSIVE-OR element 44 serves as the output terminal 8.

Figure 7:
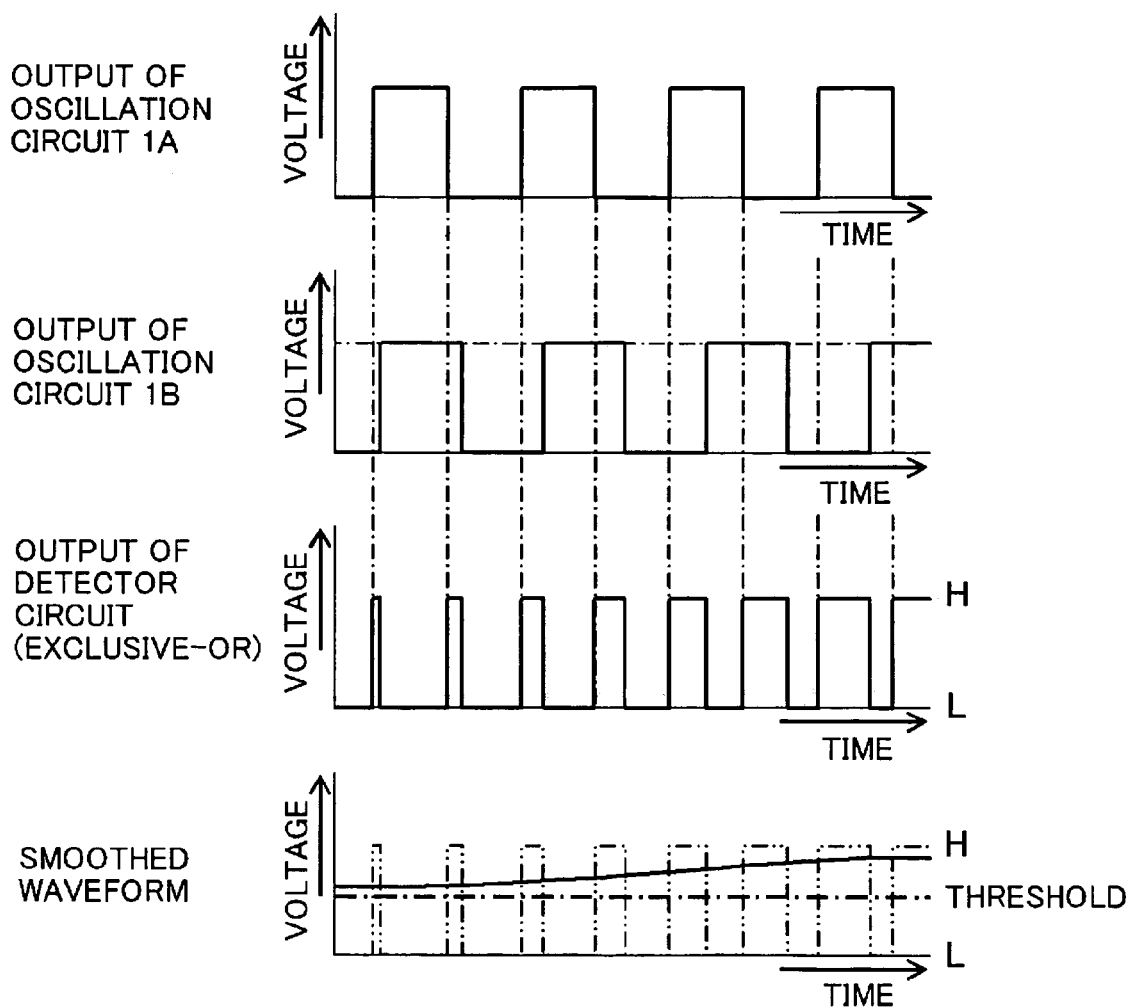
FIG. 7 includes graphs showing outputs of the wave detector circuits of the human body detection sensor of FIG. 6 as well as a signal waveform in an output circuit.

Operation of the human body detection sensor of this embodiment is explained. When outputs of the oscillation circuits 1A and 1B are tuned with each other, two inputs of the EXCLUSIVE-OR element 40 are equal to each other at all times, so that no voltage is outputted from the wave detector circuit 6. Then, the two inputs of the EXCLUSIVE-OR element 44 come to a LO level state with no input at all times, where the EXCLUSIVE-OR element 44 does not output a voltage to the output terminal 8 at all times. However, when the oscillation circuit 1A and the oscillation circuit 1B are shifted in oscillating frequency from each other as shown in FIG. 7, the EXCLUSIVE-OR element 40 outputs a rectangular wave. This output is smoothed by the diode 41, the capacitor 42 and the resistor 43, but the EXCLUSIVE-OR elements 40 and 44 are high in input impedance and low in output impedance, so that as shown in the figure, the smoothed voltage inputted to the EXCLUSIVE-OR element 44 comes to a value larger than the threshold value of the EXCLUSIVE-OR element 44 at all times. Therefore, when the oscillation circuits 1A and 1B are shifted in oscillating frequency from each other, the EXCLUSIVE-OR element 44 outputs the voltage continuously to the output terminal 8.

Figure 8:
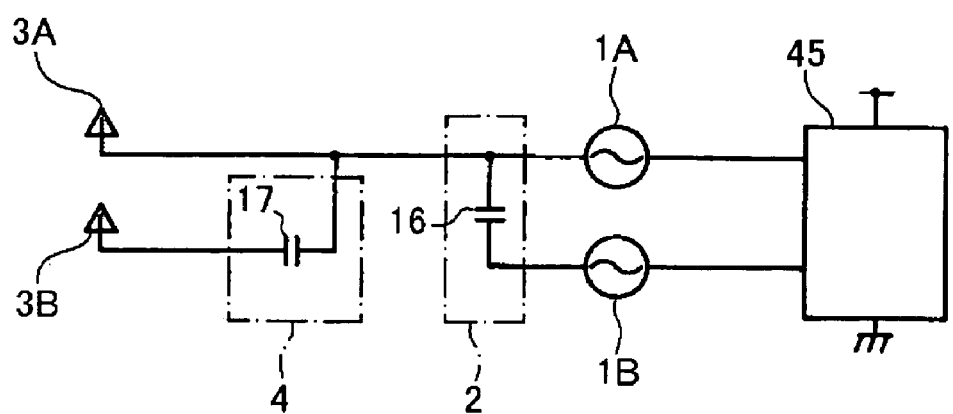
FIG. 8 is a circuit diagram of a human body detection sensor according to a fourth embodiment of the invention.

Further, a circuit diagram of a human body detection sensor according to a fourth embodiment of the invention is shown in FIG. 8. This embodiment is an embodiment in which the wave detector circuit 6 of the third embodiment is replaced with a microcomputer 45. Since the microcomputer 45 is intended to control those units for which control is determined depending on detection results of the human body detection sensor, there are no need for an output circuit or an output terminal for amplifying and outputting a signal.

The human body detection sensor of the present invention is usable for every device or equipment that starts up a system on detecting approach of any person or that performs different sequences of control depending on the presence or absence of a person, such as household equipment or automobile keyless entry systems.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A human body detection sensor comprising:
   a first oscillation circuit and a second oscillation circuit;
   a tuning circuit which connects equivalent points of the first and second oscillation circuits to each other, the tuning circuit being constructed so that part of a feedback current of either one of the first and second oscillation circuits flows to the other of the first and second oscillation circuits;
   an antenna electrode which is connected to any one of the first and second oscillation circuits so that a change in circuit state occurs upon approach of a human body; and
   a wave detector circuit for detecting a shift of oscillation between the first and second oscillation circuits.

2. The human body detection sensor as claimed in claim 1, wherein
   the tuning circuit is a circuit which connects the first and second oscillation circuits to each other via at least one element.

3. The human body detection sensor as claimed in claim 1, wherein
   the antenna electrode comprises a plurality of antenna electrodes.

4. The human body detection sensor as claimed in claim 1, wherein
   a sensitivity control circuit is provided between the antenna electrode and the first and second oscillation circuits.

5. The human body detection sensor as claimed in claim 1, wherein
   a protection circuit for blocking or reducing inflow of static electricity from the antenna electrode to the first and second oscillation circuits is provided between the antenna electrode and the first and second oscillation circuits.

* * * * *